United States Patent [19]

Sipilä et al.

[11] 4,075,486
[45] Feb. 21, 1978

[54] METHOD AND DEVICE FOR DIMINISHING THE BACKGROUND EFFECT IN A PROPORTIONAL COUNTER

[75] Inventors: Heikki Johannes Sipilä; Erkki Sakari Kiuru, both of Espoo, Finland

[73] Assignee: Outokumpu Oy, Outokumpu, Finland

[21] Appl. No.: 765,584

[22] Filed: Feb. 4, 1977

[30] Foreign Application Priority Data

Feb. 5, 1976 Finland .................................. 760280

[51] Int. Cl.$^2$ ................................................ G01T 1/18
[52] U.S. Cl. ................................................... 250/374
[58] Field of Search ........................ 250/374, 388, 375

[56] References Cited
U.S. PATENT DOCUMENTS

| | | | |
|---|---|---|---|
| 3,683,189 | 8/1972 | Garrett | 250/374 X |
| 3,715,593 | 2/1973 | McCunigle | 250/374 |
| 3,959,653 | 5/1976 | Lee et al. | 250/374 |

*Primary Examiner*—Davis L. Willis

[57] ABSTRACT

In a proportional counter comprising a detector for detecting radiation pulses, an energy channel for receiving detected pulses, preferably as pre-amplified, from the detector, and a pulse height analyzer for the analysis of pulses received from the energy channel, the background effect is reduced by measuring the detector charge pulse collection time caused by electron diffusion and the time interval between the detector pulses, comparing the measured times with predetermined limit values and, thereupon, discriminating all pulses which have collection times longer than the predetermined rise time that is have too long a rise time, or which appear at shorter intervals than the predetermined limit interval, that is are too close to an adjacent pulse be it a preceding or following pulse. In order to produce signals proportional to said rise time and said time interval, the pulses are preferably transformed in electronic circuits, for example, in two derivation circuits and one integration circuit. The predetermined limit values may be represented by two reference voltages and the discrimination is carried out by using known logic circuits.

6 Claims, 7 Drawing Figures

METHOD AND DEVICE FOR DIMINISHING THE BACKGROUND EFFECT IN A PROPORTIONAL COUNTER

BACKGROUND OF THE INVENTION

1. Field of the invention

The present invention relates to a method and a device for reducing the background effect in a proportional counter by using rise time and pulse interval analysis. It is specifically applicable in X-ray analysis and it shall in the following be described in relation thereto.

2. Description of the Prior Art

The detection limit of X-ray analysis is determined by the background radiation produced within the energy range to be measured. In a method using a proportional counter as a detector, this background results from the so-called wall effect of the detector. The reason for this is the partial absorption, in the detector medium and wall, of the photoelectron produced by an X-ray quantum; this results in a background spectrum as shown in FIG. 1.

The position of the absorption trace of an X-ray quantum can be recognized on the basis of the charge collection time. Owing to electronic diffusion, the collection time is longer when the absorption has taken place farther away from the central wire of the detector. The variation of the collection time can be seen in the rise times of the charge pulses; thus the pulses coming from close to the detector wall can be recognized and eliminated by measuring the rise times.

The X-ray quantum can cause several absorption traces in various parts of the detector because an excited atom produced in a photoelectric absorption can radiate its characteristic quanta, which again can cause new absorption traces. Some of them can be partly absorbed in the wall; some total charges can remain smaller than presupposed by the energy of the X-ray quantum.

The influence of the wall effect described above can be eliminated by performing a rise time analysis of the detector pulses. This method has previously been used (Mathieson. Harris, Nuclear Instruments and Methods 96 (1971), pp. 397–403) for the elimination of the space radiation background in connection with proportional counters.

SUMMARY OF THE INVENTION

This invention provides a method for diminishing the background effect in a proportional counter by using rise time and pulse interval analysis, in which method the detector charge pulse collection time caused by electron diffusion and the interval between detector pulses are measured, said measured times are compared with predetermined limit values thereof, and detector pulses which have collection times longer than the predetermined rise time or which appear more frequently than at the predetermined intervals are discriminated.

The invention also suggests a porportional counter for carrying out this method, said counter comprising a detector for detecting radiation pulses, an energy measuring channel receiving pulses from the detector, a pulse height analyser receiving pulses from the energy channel, first and second circuit means for forming signals proportional to the rise time and to the intervals of the detector pulses, and for forming signals representative of predetermined limit values of said rise time and time interval, respectively, and, finally, discriminator means for discriminating detector pulses which have collection times longer than the predetermined rise time or which appear more frequently than at the predetermined time interval.

Thus, in the present method the rise time analysis is applied to the collection time caused by electronic diffusion. In known methods, the multiple absorption traces mentioned above complicate the rise time analysis so that the preceding charge pulse distorts the rise time information on the next one. This error has been eliminated in the present invention by pulse interval discrimination, i.e., by rejecting all the pulses which arrive at time intervals shorter than a predetermined wait period. The wait period in question is at least as long as the period in which an electron passes from the cathode of the detector to its anode.

DESCRIPTION OF THE PREFERRED EMBODIMENTS

Figure 1:
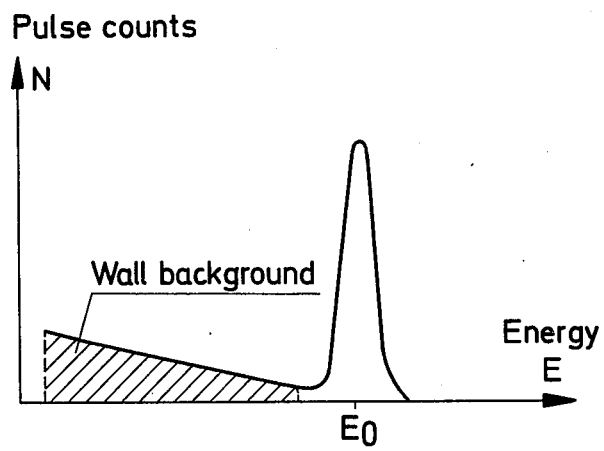
FIG. 1 shows an X-ray spectrum, in which the background spectrum caused by the partial absorption of a photoelectron into the detector medium and wall is indicated by shading.
Figure 2:
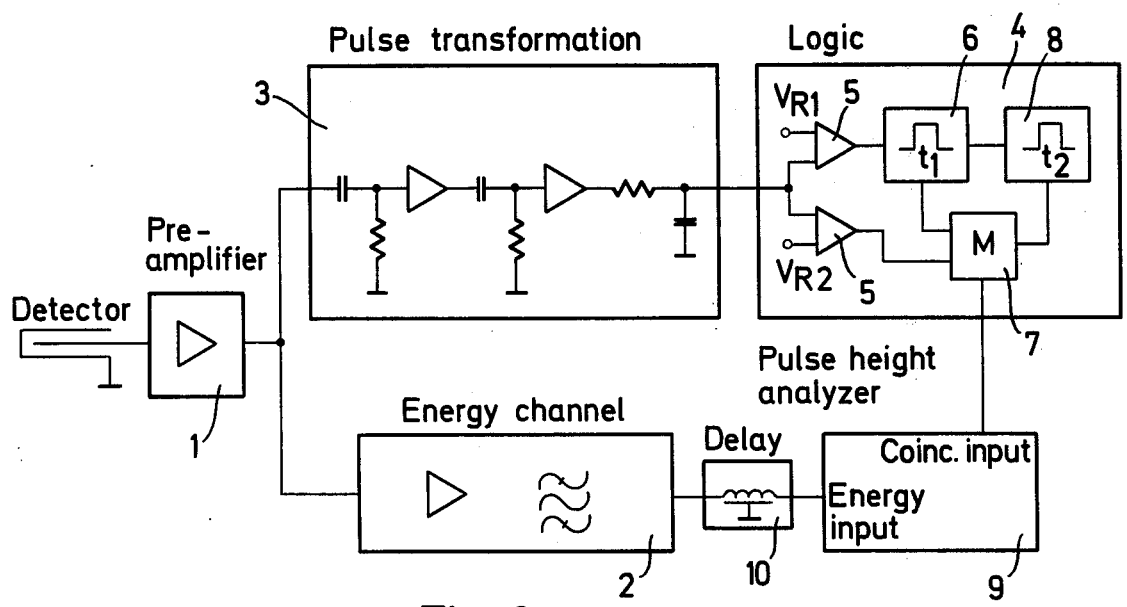
FIG. 2 shows a block diagram of a device according to the invention.
Figure 3:
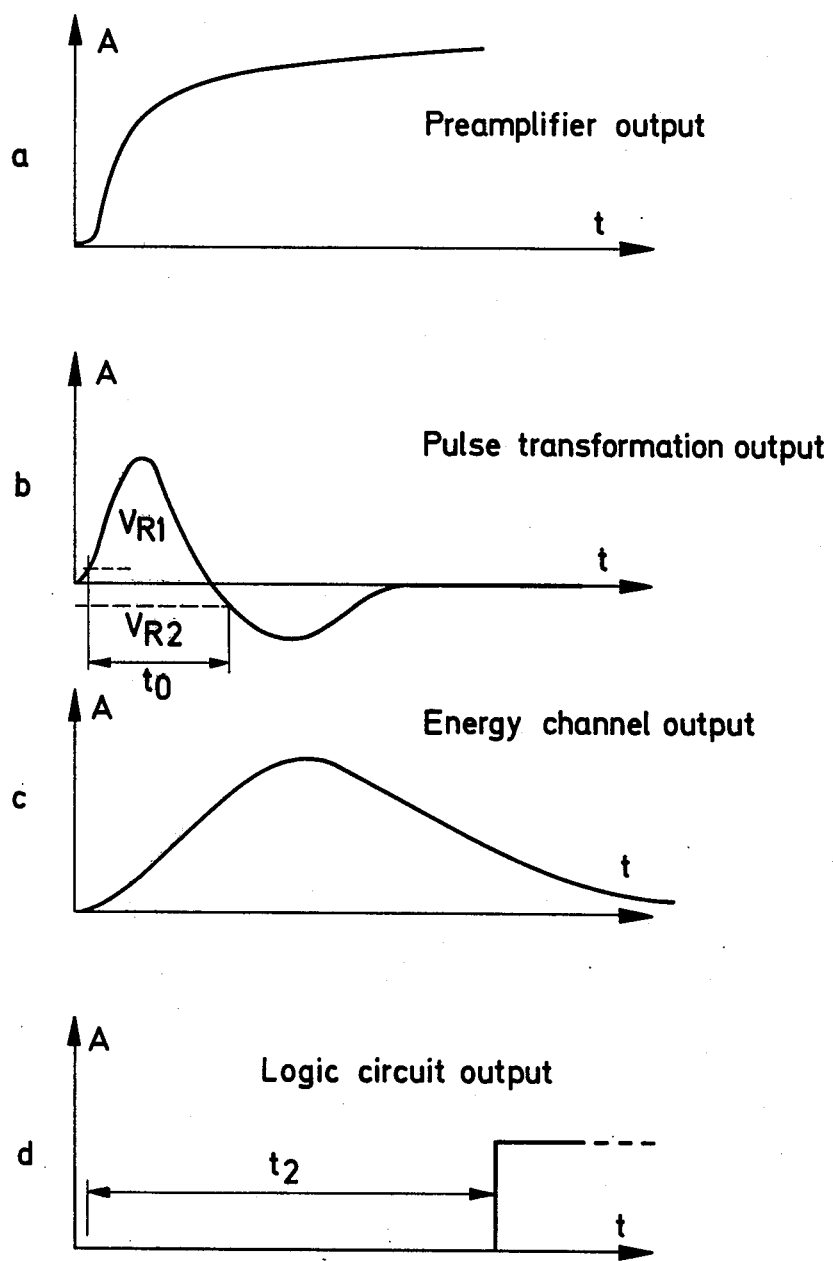
FIGS. 3a–d show signal forms relating to the description of the operation of the device.

The operation of the device is described below with reference to FIGS. 2-4. In parallel with a conventional energy measuring channel 2 there is a rise time channel (blocks 3 and 4), which works as follows. The pulses received from the pre-amplifier 1 (FIG. 3a) are amplified, derived twice, and integrated in the pulse transformation part 3 in such a manner that the zero crossing time $t_0$ of the resulting bipolar signal (FIG. 3b) is proportional to the detector pulse collection time. In the logic part 4 the zero crossing time is measured by means of comparators 5 and is compared with a time reference $t_1$ (6). The result is carried to a memory circuit 7. In addition, the interval between successive pulses is measured by a time reference $t_2$ (8), and the content of the memory circuit is converted on the basis of this measurement. The information on the acceptance of rejection of the measured energy quantum is fed into the coincidence input of the pulse height analyzer 9. Because the information of the rise time channel is in principle delayed by the logic wait period $t_2$, care must be taken that the signal of the energy channel is delayed in the same manner, either in connection with the pulse height analysis or on the external delay line 10. The pulse forms in the various parts of the device are depicted in FIG. 3.

The pre-amplifier, energy channel, delay circuit and pulse height analyzer of the block diagram shown in FIG. 2 may be constituted by known, commercially available units, for example as follows:

pre-amplifier ORTEC 109 PC
energy channel ORTEC 716
delay circuit Matthey UN 006
pulse height analyzer Nokia LP4840, as provided with the coincidence unit LP4844.

Figure 4:
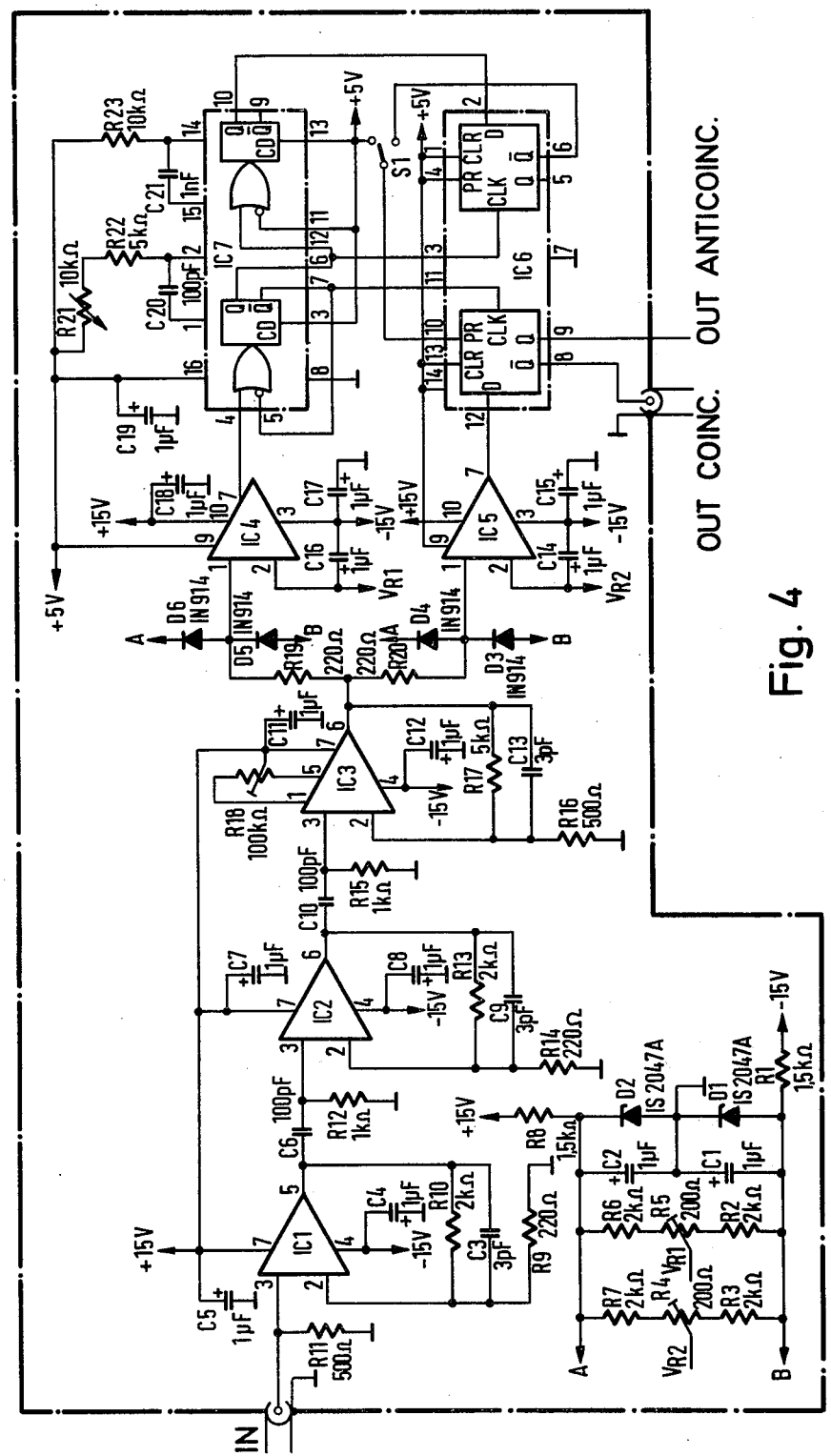
FIG. 4 shows, as an example, the practical circuit diagram of blocks 3 and 4 in FIG. 2.
Figure 5:
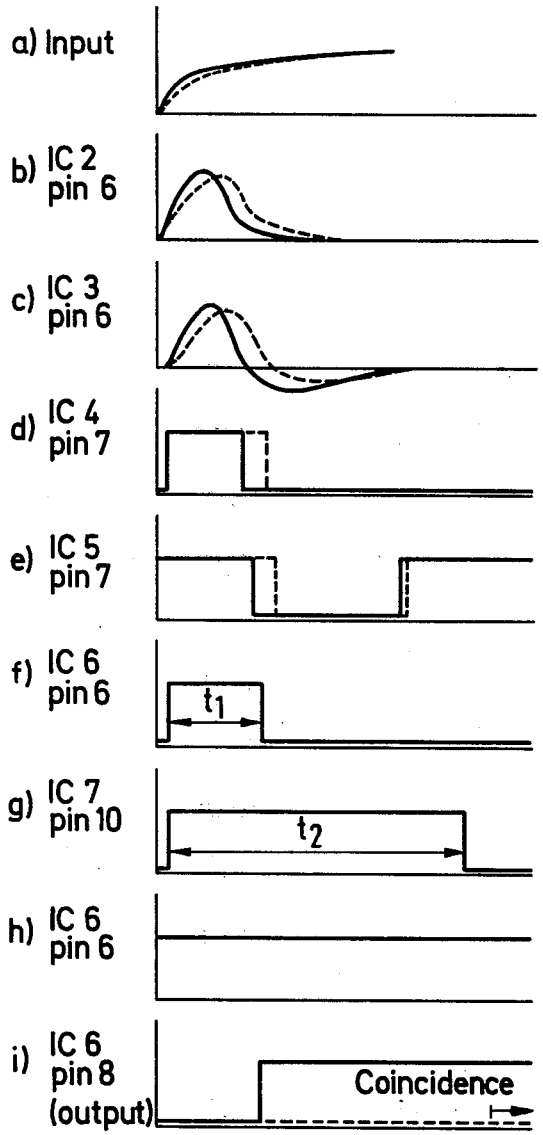
FIGS. 5 and 6 show pulse forms relating to the description of the circuit diagram of FIG. 4.
Figure 6:
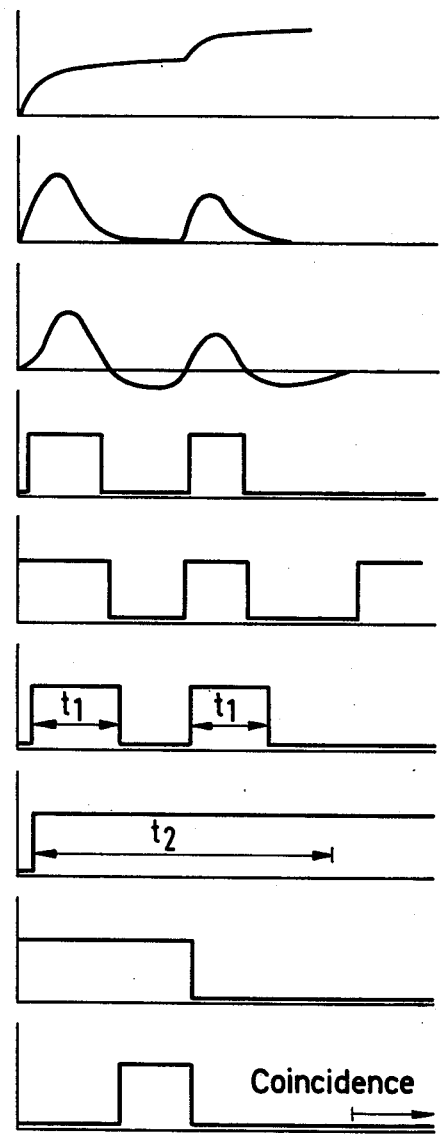

An example of a schematic diagram of the rise-time channel including the logic circuit is shown in FIG. 4 and the pulse forms relating thereto are shown in FIGS. 5 and 6. The input impedance of the channel has been matched to 500 by a resistance R11. The signal is amplified in IC1, the amplification of which has been fixed to 10 by the resistors R9 and R10. Thereafter, the signal is derived in the circuit C6, R12. The amplification factor of IC2 is also 10 as defined by resistors R14 and R15. A second derivation takes place in the circuit C10, R15. Further, the amplification factor of IC3 is again 10 as defined by resistors R16 and R17. The natural upper cut-off frequency of IC3 corresponds in this case to one RC-integration. The capacitors C3, C9 and C13 are stabilizing capacitors. With the resistance R18 the offset voltage of IC3 is adjusted to zero. The FIGS. 5 and 6 show in (a) . . . (c) pulse shapes in the pulse transformation unit.

The signal is transferred to the comparators IC4 and IC5 through separating resistors R19 and R20. The diodes D3 . . . D6 together with the circuit R1 . . . R8, C1, C2, D1, D2 creating the reference voltages $V_{R1}$ and $R_{R2}$ protect the input terminals of the comparators from too high voltages. The output signals from the comparators correspond to (d) and (e) in FIGS. 5 and 6.

The leading edge of the output pulse from IC4 fires the first monostable of IC7. The pulse length thereof is $t_1$ and it can be adjusted with help of the circuit C20, R21, R22. The first monostable further fires the second monostable having a period $t_2$ as determined by the components C21, R23. The output of the first monostable serves as a clock pulse signal for the D-flip-flops of IC6. When the switch S1 is in its upper position, no elimination of double traces takes place. The preset of the first D-flip-flop is "1" so that the information from the D-input is transferred at the rising edge of the clock pulse to the coincidence output. Thus, if the output of IC5 is "0" before the end of $t_1$, the coincidence signal is "1," otherwise it is "0." The double traces are eliminated when S1 is in its lower position. If a second detector pulse arrives to be treated before the period $t_2$ of the monostable has ended, it restarts the first monostable of IC7 and extends the period of the second with $t_2$. The Q-output of the second D-flip-flop of IC6 changes at the leading edge of the clock pulse to "0," which in turn at the present-input of the first flip-flop turns the coincidence output into "0," as is shown in FIG. 6.

The capacitors C14 . . . C19 shown in the figures serve the purpose of filtering the reference and supply voltages.

Figure 7:
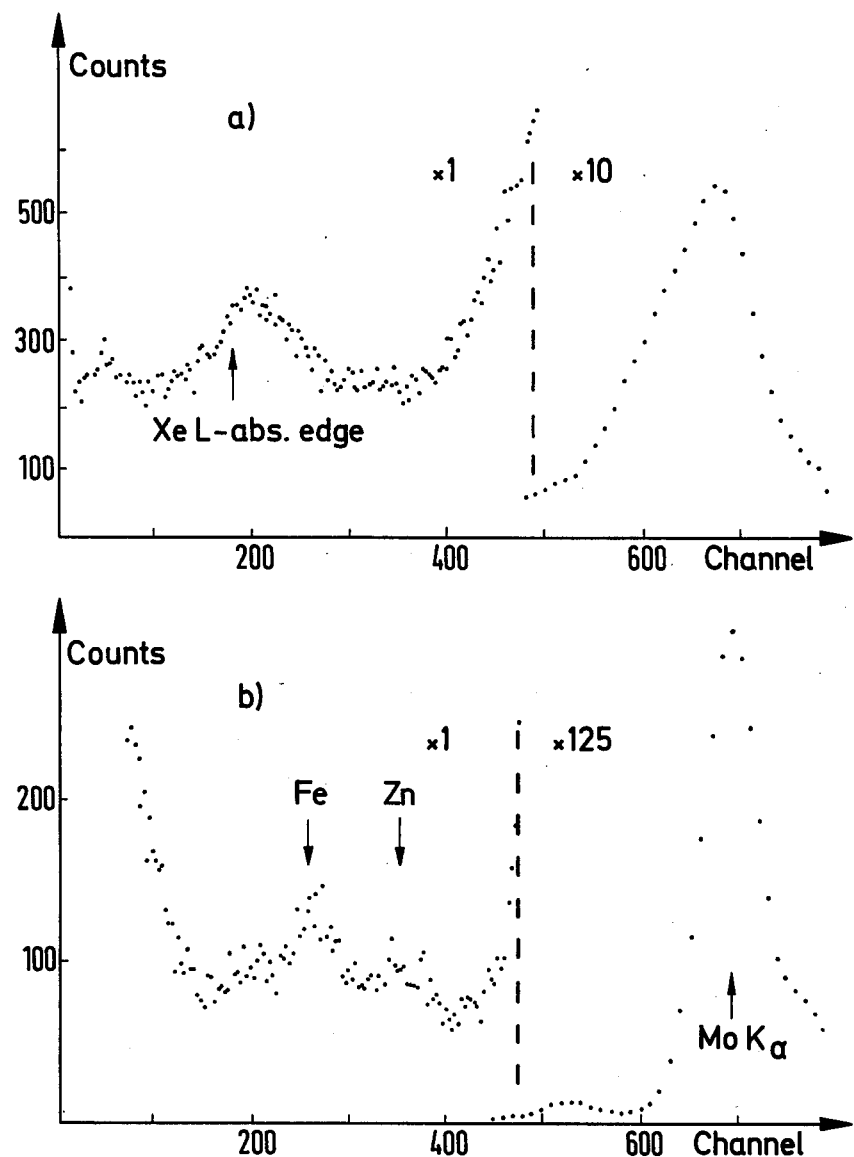
FIG. 7 shows diagrams for the effect of the risetime discrimination on background, (a) as measured in the original spectrum during 1 hour and (b) with discrimination adjusted to 50 percent at Fe-55 5.9keV radiation, measured during 18 hours.

In FIG. 7 there is shown an example of the influence of the device upon the background. The energy creating the background was MoK$\alpha$ (17, 7 Kev) as activated by a Cd-109 source. Diagram (a) of FIG. 7 shows the effect of the risetime discrimination on the background as measured in the original spectrum during a time of 1 hour. Diagram (b) of FIG. 7 shows a spectrum measured during 18 hours with the discriminating adjusted to 50 percent of Fe-55 5.9 KeV radiation. It is appreciated from the figures that the signal to background ratio is improved by a factor of approximately 20. It is further noted that the resolution has improved substantially. This is due to elimination of incomplete charge accumulations for the reason of long rise times.

What is claimed is:

1. A method for diminising the background effect in a proportional counter by using rise time and pulse interval analysis, which comprises
   measuring the detector charge pulse collection time caused by electron diffusion;
   measuring the interval between the detector pulses;
   comparing said measured times with predetermined limit values; and
   discriminating detector pulses which have collection times longer than said predetermined rise time as well as pulses which appear at shorter intervals than said predetermined limit value.

2. A method according to claim 1, wherein a voltage signal proportional to the charge pulse collection time is formed and this signal is compared with the reference signal corresponding to the predetermined limit value of the collection time.

3. A method according to claim 2, wherein in order to form a signal proportional to the collection time, the pulses coming from the detector are pre-amplified and transformed twice by derivation and once by integration so that a bipolar signal is obtained, the zero crossing time of which is proportional to the said collection time.

4. A proportional counter with reduced background effect, comprising
   a detector for detecting radiation pulses;
   an energy measuring channel receiving detected pulses;
   a pulse height analyzer for performing analysis of said radiation pulses;
   first circuit means connected in parallel with said energy measuring channel for forming signals proportional to the rise time as well as to the intervals of the detector pulses;
   second circuit means for forming reference signals corresponding to predetermined limit values of said rise time and time interval of the detector pulses; and
   discriminator means for the discrimination of detector pulses which have collection times longer than the predetermined rise time as well as pulses appearing more frequently than at the predetermined time interval.

5. A proportional counter according to claim 4, wherein the first circuits means for forming signals proportional to the rise time of detector pulses and the pulse interval include pulse transforming members which transform a pulse into a bipolar signal the zero crossing time of which is proportional to the pulse collection time.

6. A proportional counter according to claim 5, wherein said pulse transforming members comprise two derivation circuits and one integration circuit.

* * * * *